Sept. 24, 1946.　　　B. B. GRACE ET AL　　　2,408,060

ELECTRICAL MEASURING INSTRUMENT

Original Filed June 12, 1943

Inventors
Bertram Barnett Grace
John Handley
Gilbert Gilliver
By
Attorney

Patented Sept. 24, 1946

2,408,060

UNITED STATES PATENT OFFICE 2,408,060

ELECTRICAL MEASURING INSTRUMENT

Bertram Barnett Grace, John Handley, and Gilbert Gilliver, London, England, assignors, by mesne assignments, to International Standard Electric Corporation, New York, N. Y., a corporation of Delaware Original application June 12, 1943, Serial No. 490,627. Divided and this application November 29, 1943, Serial No. 512,176. In Great Britain July 17, 1942

6 Claims. (Cl. 171—95)

This invention relates to electrical measuring instruments of the moving coil type in which the permanent magnet is situated within the moving coil while a ring of magnetic material surrounds the magnet and coil assembly to define the outer periphery of the air gap in which the coil swings and to complete the magnetic system, and is a division of our co-pending application Serial No. 490,627 filed June 12, 1943.

The invention consists in using for the permanent magnet on an element of an alloy of high BH (max) which has been subjected to a steady magnetic field during cooling and in assembling the parts so that the direction of maximum magnetisability of said element as determined by said treatment during cooling shall be coincident with the direction in which the element is then magnetised after assembly.

The invention will now be described with reference to the accompanying drawing, in which.

Figure 1:
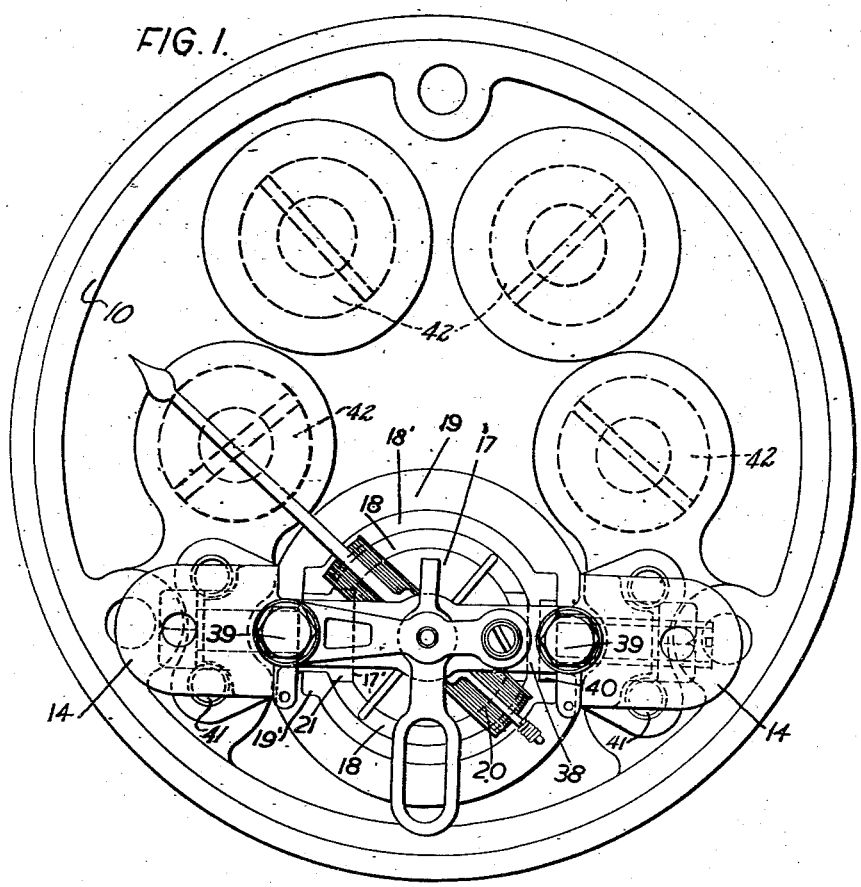
Fig. 1 is a front view with cover and scale removed.
Figure 2:
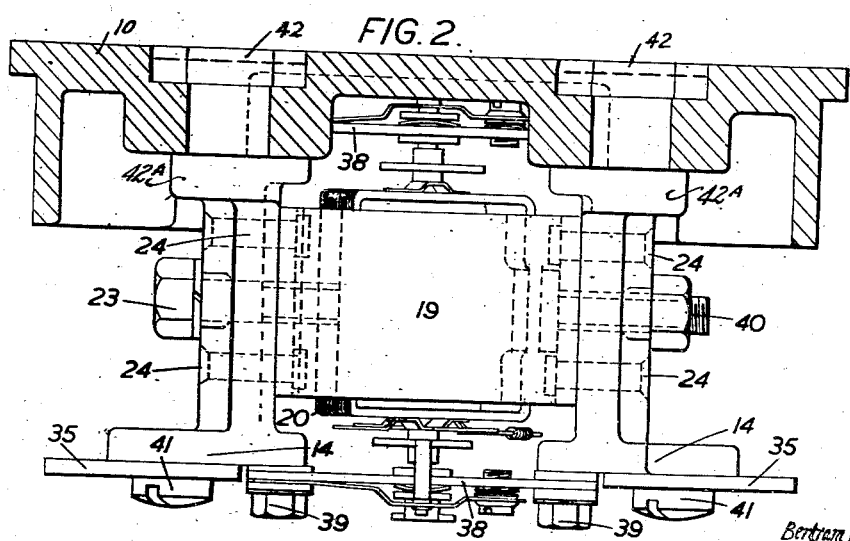
Fig. 2 is a top plan view with the base or rear cover shown in section on the centre line.

The framework of the mechanism consists of a ring-shaped-pole-piece 19 to which two die cast supports 14 are rigidly attached by rivets 24.

The central permanent magnet 17 is cylindrical in shape but with a flat portion 17' on one side and it is fitted within a cradle of non-magnetic material comprising a pedestal 21 and a pair of diametrically opposite pole shoes 18 the pedestal being adjacent to the flat portion on the magnet and insuring that the magnet is assembled in a definite angular position. When assembled the magnet is magnetised across its diameter, the magnetic axis being parallel to the flat portion and corresponding to the direction of the magnetic field in which the material was heat treated during manufacture. Reference may be made for example to the article in "Nature" for July 30, 1938, page 209 for such special process of magnetisation. The magnet and pole shoe assembly is held in the ring by the pedestal, which is located in one of the recesses 19' in the ring and secured by the screw 23.

The outer ring 19 is concentric with the magnet and its polepieces, so that an arcuate air gap 18' is formed between them with the centre of the two opposite arcs coincident with the axis of the cylindrical magnet.

The moving coil 20 is of rectangular shape embracing the magnet so that its opposite sides swing in the air gap 18' on its pivots which are coincident with the geometric axis of the magnet and outer ring.

The pivot bearings, control springs and adjusters are mounted on the two bridge pieces 38 which are attached to the framework by the screws 39. The bridge pieces are insulated from the frame by bushings and washers.

The open ends of the pole shoes 18 are extended towards one another at a reduced width and machined off flat on their extended portions. A short-circuiting screwed plunger 40 is provided to short circuit or shunt the magnetic flux from one pole shoe to the other and so reduce the flux density in the gap for the purpose of finally adjusting the deflection of the instrument.

The framework is attached to the base 10 of the instrument by four screws 42 which are screwed through the base into lugs 42A on the rear end of the die castings 14.

The scale plate 35 is attached to lugs on the front of the die castings by screws 41.

The permanent magnet 17 is made from material having a very high $BH_{max}$, where B is the remanence, H is the coercive force and $BH_{max}$ is the maximum product of these two values. The best of such materials at present known are alloys of aluminium, nickel and cobalt, which have been so heat treated in a magnetic field as to enable a much higher $BH_{max}$ to be obtained, when subsequently magnetised in the same direction. This gives a very high flux density in the arcuate air gaps between the pole shoes and the ring. One such permanent magnet material is sold under the trade name of Ticonal 42/50.

The proportions of the magnet system are so chosen that the magnet produces its $BH_{max}$, a condition that is dependent on the relationship between: the cross sectional area of the magnet S, the average length of the flux path in the magnet L, the cross sectional area of the flux path in the gap s, the combined length of the flux paths in the two gaps l, and the leakage factor f.

The proportions are then given by $$\frac{B}{H} = \frac{Lsf}{lS}$$

For Ticonal 42/50, $BH_{max} = 4.22 \times 10^6$ where B=8600 lines per sq. cm. and H=490 Gilberts per cm. so that $$\frac{B}{H} = \frac{8600}{490} = 17.5$$

The dimensions of the magnet system therefore are so proportioned that $$\frac{Lsf}{lS} = 17.5 \text{ approximately}$$

The width of the air gap is no more than is necessary to accommodate the coil with working clearances (say 1.2 m/m). The circumferential length of the gap is determined by the angular swing of the coil and pointer, and a suitable diameter and length of magnet and the leakage factor are calculated to give the correct ratio of B/H.

It will be understood that the invention may take other forms an example being that in which the magnetic flux is not to be uniformly distributed throughout the length of the gap, which may be attained by non-circular curvature of the poles or upstanding portions of the outer ring or by these surfaces being eccentric in relation to the axis of the magnet and pivots, and producing air gaps of varying widths.

What is claimed is:

1. An electrical measuring instrument comprising a permanent magnet consisting of a cylindrical element of an alloy of iron, aluminium, nickel and cobalt which element has been subjected during cooling to a steady magnetic field across a diameter and has been permanently magnetised along said diameter; a pair of cylindrical-arcuate pole-shoes of high permeability material overlying the poles of the magnet; a cradle of non-magnetic material to which the pole-pieces are secured in such positions that they grip the magnet between them; a continuous ring of high permeability material surrounding the magnet-and-pole-shoe assembly coaxially therewith and formed with upstanding portions in juxtaposition to the pole-shoes to define therewith the two opposite arcs of a cylindrical-arcuate air-gap; and a moving coil embracing the magnet-and-pole-shoe assembly and pivoting centrally about an axis coincident with the axis of the magnet-system; the magnet-and-pole-shoe assembly being accurately located with respect to the continuous ring by the seating of the cradle in a gap between the upstanding portions of the ring.

2. An electrical measuring instrument, comprising a moving coil and a permanent magnet within said coil, said permanent magnet consisting of an element rendered magnetically anisotropic during heat treatment and permanently magnetized in substantially one direction, said direction being substantially perpendicular to that of the path of said moving coil.

3. An electrical measuring instrument, comprising a moving coil, a permanent magnet within said coil, said permanent magnet consisting of an element rendered magnetically anisotropic during heat treatment, a cradle comprising a nonmagnetic pedestal and a pair of diametrically opposite pole shoes surrounding said permanent magnet and means carried respectively by said permanent magnet and said pedestal to locate the permanent magnet in the correct angular position to have it magnetized in a field in the same direction as the field in which it was heat treated, said direction being substantially perpendicular to that of the path of said moving coil.

4. An electrical measuring instrument, comprising a moving coil, a cylindrical permanent magnet within said coil, said magnet having a flat portion on one side thereof and consisting of an element of an alloy of high BH max which has been subjected to a steady magnetic field during cooling, a cradle comprising a non-magnetic pedestal and a pair of arcuate pole shoes overlying the poles of the permanent magnet and a flat surface on said pedestal engageable with the flat portion of the permanent magnet to locate the magnet in the correct angular position to have it magnetized in a field in the same direction as the field in which it was heat treated, said direction being substantially perpendicular to that of the path of said moving coil, and said flat surface being substantially parallel to said direction of magnetization.

5. An instrument according to claim 2, wherein said direction of magnetization is substantially perpendicular to the direction of the path of said moving coil in its medium position.

6. An instrument according to claim 2, wherein said moving coil is arranged rotatably about an axis, said permanent magnet has pole pieces forming a cylindrical air gap to receive said moving coil, and said direction of magnetization is substantially perpendicular to the axis of said moving coil.

BERTRAM BARNETT GRACE.
JOHN HANDLEY.
GILBERT GILLIVER.